United States Patent
Avron et al.

(10) Patent No.: US 9,658,987 B2
(45) Date of Patent: May 23, 2017

(54) REGRESSION USING M-ESTIMATORS AND POLYNOMIAL KERNEL SUPPORT VECTOR MACHINES AND PRINCIPAL COMPONENT REGRESSION

(71) Applicant: INTERNATIONAL BUSINESS MACHINES CORPORATION, Armonk, NY (US)

(72) Inventors: Haim Avron, White Plains, NY (US); Kenneth L. Clarkson, Madison, NJ (US); Huy Le Nguyen, Princeton, NJ (US); David P. Woodruff, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 14/279,177

(22) Filed: May 15, 2014

(65) Prior Publication Data

US 2015/0331835 A1    Nov. 19, 2015

(51) Int. Cl.
  *G06F 19/00*  (2011.01)
  *G06F 17/18*  (2006.01)
(52) U.S. Cl.
  CPC .................... *G06F 17/18* (2013.01)
(58) Field of Classification Search
  CPC ...... G06Q 10/06; G06Q 10/10; G06Q 10/107; G06Q 50/18; H04L 63/0227
  USPC .......................... 702/179, 182–185
  See application file for complete search history.

(56) References Cited

U.S. PATENT DOCUMENTS

| | | |
|---|---|---|
| 7,395,250 B1 | 7/2008 | Aggarwal et al. |
| 2010/0250497 A1* | 9/2010 | Redlich .................. F41H 13/00 707/661 |
| 2011/0045996 A1 | 2/2011 | Yeo et al. |
| 2012/0131006 A1 | 5/2012 | Siddiqui |
| 2012/0165206 A1 | 6/2012 | Rosenfeld et al. |
| 2013/0191309 A1 | 7/2013 | Lakshminarayan |
| 2013/0191425 A1 | 7/2013 | Porikli et al. |

(Continued)

FOREIGN PATENT DOCUMENTS

| | | |
|---|---|---|
| TW | 200832243 A | 8/2008 |
| WO | WO02059828 A2 | 8/2002 |

(Continued)

OTHER PUBLICATIONS

Yang, H., et al., "Prediction Model for Production Indexes of a Flotation Circuit Based on Adaptive PCA and Composite Kernel Support Vector Regression", IEEE, 2010, pp. 1-4, United States.

(Continued)

*Primary Examiner* — Edward Raymond
(74) *Attorney, Agent, or Firm* — Sherman IP LLP; Kenneth L. Sherman; Steven Laut

(57) ABSTRACT

Embodiments of the invention relate to sketching for M-estimators for performing regression. One embodiment includes providing one or more sets of input data. A matrix A and a vector b are generated using the input data. A processor device is used for processing the matrix A and the vector b based on a randomized sketching matrix S. A vector x that minimizes a normalized measure function is determined based on the matrix A and the vector b. A relationship between the input data is determined based on the vector x.

20 Claims, 5 Drawing Sheets

(56) References Cited

U.S. PATENT DOCUMENTS

2013/0290222 A1   10/2013   Gordo et al.

FOREIGN PATENT DOCUMENTS

| WO | WO03040949 A1 | 5/2003 |
| WO | WO2012097336 A1 | 7/2012 |

OTHER PUBLICATIONS

Yang, H., et al., "A Soft Sensor Based on Kernel PCA and Composite Kernel Support Vector Regression for a Flotation Circuit", IEEE, 2010, pp. 375-378, United States.

Wen, K.Y., "Machine Parameter Deduction by Program Analysis", Aug. 1974, 71 pp., Report No. UIUCDCS-R-74-636, National Science Foundation, Washington, D.C., United States.

Stewart, G.W., "Simultaneous Iteration for Computing Invariant Subspaces of Non-Hermitian Matrices", Oct. 1974, 29 pp., Report No. N00014-67-A-0218-0018-332, Office of Naval Research, Arlington, VA 22217.

Bougeard, M.L. et al., "Parallel proximal decomposition algorithms for robust estimation", Annals of Operations Research, 1999, pp. 247-270, v.90, J.C. Baltzer, Science Publishers, Netherlands.

Baryamureeba, V., "Solution of Robust Linear Regression Problems by Krylov subspace methods", 2004, pp. 67-75, Springer-Verlag, Berlin, Germany.

\* cited by examiner

REGRESSION USING M-ESTIMATORS AND POLYNOMIAL KERNEL SUPPORT VECTOR MACHINES AND PRINCIPAL COMPONENT REGRESSION

This invention was made with Government support under FA8750-12-C-0323 P00003 awarded by Defense Advanced Research Projects Agency (DARPA). The Government has certain rights in this invention.

BACKGROUND

Embodiments of the invention relate to regression processing and, in particular, sketching for M-estimators for performing regression and providing an oblivious subspace embedding (OSE) for embedding a space induced by a nonlinear kernel.

Linear regression is widely used in biological, behavioral and social sciences to describe possible relationships between variables. It ranks as one of the most important tools used in these disciplines. Regression processing sometimes involves the tool of sketching, which in generality is a descendent of random projection methods. Sketching has emerged as a powerful dimensionality reduction technique for accelerating statistical learning techniques such as $l_p$-regression, low rank approximation, principal component analysis (PCA), and support vector machines. For natural settings of parameters, the sketching technique has led to asymptotically optimal algorithms for a number of applications, often providing a speedup of order of magnitude over slower exact algorithms given by, e.g., the singular value decomposition (SVD). Oblivious subspace embedding (OSE) is essentially a data-independent random transform which is an approximate isometry over a subspace. It is crucial for any reasonable use of an OSE that applying it to a vector or a collection of vectors (a matrix) can be done in time that is faster than that of the nave algorithm, or at least faster than the intended downstream use.

Conventional OSEs are for subspaces that have a representation as the column space of an explicitly provided matrix, or close variants of it, and they admit a fast multiplication given an explicit representation of a vector or matrix (either dense or sparse). This is quite unsatisfactory in many statistical learning settings. In many cases the input may be described by a moderately sized n-by-d sample-by-feature matrix A, but the actual learning is done in a much higher (possibly infinite) dimensional space, by mapping each row of A to the higher dimensional feature space.

BRIEF SUMMARY

Embodiments of the invention relate to sketching for M-estimators for performing regression. One embodiment includes a method that includes providing one or more sets of input data. A matrix A and a vector b are generated using the input data. A processor device is used for processing the matrix A and the vector b based on a randomized sketching matrix S. A vector x that minimizes a normalized measure function is determined based on the matrix A and the vector b. A relationship between the input data is determined based on the vector x.

These and other features, aspects and advantages of the present invention will become understood with reference to the following description, appended claims and accompanying figures.

DETAILED DESCRIPTION

Aspects of the present invention are described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
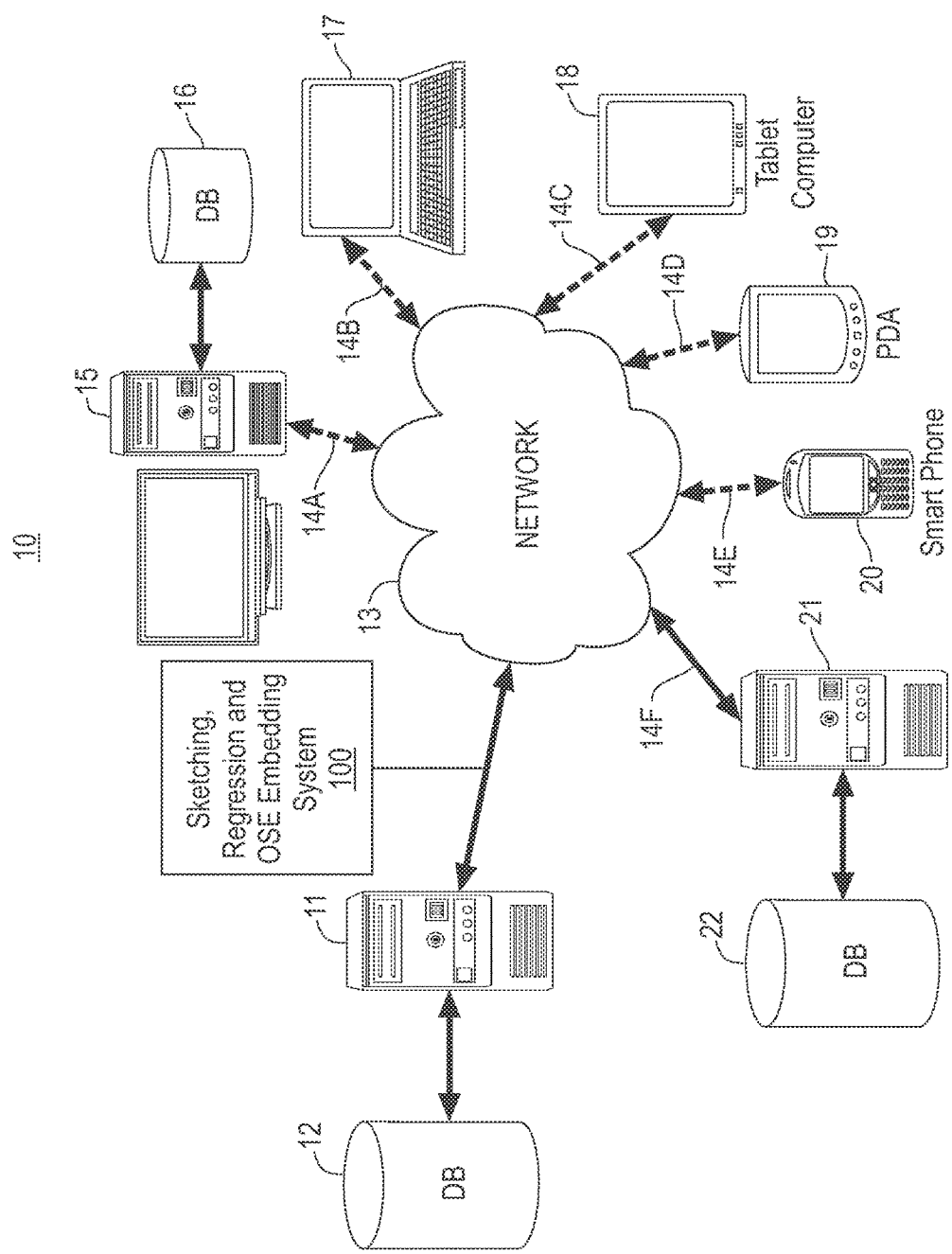
FIG. 1 is a block diagram illustrating an example of a network environment for sketching for M-estimators for performing regression and OSE embedding, according to an embodiment of the present invention.

FIG. 1 illustrates an example of the basic components of an information technology system 10 utilizing system 100, according to an embodiment of the present invention. The information technology system 10 includes a server 11 and remote devices 15 and 17-20 that may utilize the system 100 of the present invention. In one embodiment, the server 11 implements the system 100 of the present invention.

Each of the remote devices 15 and 17-20 has applications and can have a local database 16. Server 11 contains applications, and is connected to a database 12 that can be accessed by remote device 15 and 17-20 via connections 14(A-F), respectively, over a network 13. The server 11 executes software for a computer network and controls access to itself and database 12. The remote device 15 and 17-20 may access the database 12 over the network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices, and the like. Included with each remote device 15 and 17-20 is an ability to request relevant material from a large collection of documents via search queries to the server 11. Thus, when a user at one of the remote devices 15 and 17-20 desires to access the system 100 and the database 12 at the server 11, the remote device 15 and 17-20 communicates over the network 13, to access the system 100, the server 11 and database 12.

Third party computer systems 21 and databases 22 can be accessed by the server 11 in order to provide access to additional collections of documents and/or search indexes. Data that is obtained from third party computer systems 21 and database 22 can be stored on server 11 and database 12 in order to provide later access to the user on remote devices 15 and 17-20. It is also contemplated that for certain types of data, the remote devices 15 and 17-20 can access the third party computer systems 21 and database 22 directly using the network 13.

In one or more embodiments, the system 100 utilizes a process for sketching for M-estimators for performing regression and/or OSE embedding. One or more embodiments provide processing for the M-estimators of $\min_x \|Ax-b\|_G$, where $A \in \mathbb{R}^{n \times d}$ and $b \in \mathbb{R}^n$, and $\|y\|_G$ for $y \in \mathbb{R}^n$ is specified by a cost or measure function $G: \mathbb{R} \mapsto \mathbb{R}^+$, with $\|y\|_G = \Sigma_i G(y_i)$, where A is a matrix (n×d), b, x (e.g., explanatory, unknown) and y (e.g., dependent, measurements, samples, etc.) are vectors, and i, n and i are positive integers. M-estimators generalize $l_p$ (e.g., least squares, robust, etc.) regression, for which $G(x)=|x|^p$, where $p \in [1, \infty]$. In one embodiment, M-sketch is introduced, which includes a randomized construction of a sketching matrix S so that SAx may be used to estimate $\|Ax\|_G$, for all $x \in \mathbb{R}^a$. This construction yields a single sketching process for all M-estimators requiring $O(nnz(A)+poly(d \log n))$ time (where nnz is non-zero entries of the matrix A) and making one pass over the matrix in order to find a solution whose residual error is within a constant factor of optimal (e.g., as selected), with constant probability. In one example embodiment, an M-estimators using a Huber measure can be computed up to relative error $\epsilon$ in $O(nnz(A)\log n+poly(d(\log n)/\epsilon))$ time. One or more embodiments provide improvements for subspace embeddings for $l_1$ (robust regression), and for dimensionality reduction from $l_1$ into $l_1$.

In one embodiment, system 100 provides fast oblivious subspace embeddings for spaces induced by a non-linear kernel without explicitly mapping the data to the high-dimensional space. In one example, OSEs for mappings induced by the polynomial kernel are implemented. The polynomial kernel is an important kernel often used in, e.g., natural language processing. In other examples, popular kernels such as the Gaussian kernel may sometimes be approximated by the polynomial kernel using a Taylor series. In one embodiment, the implemented OSEs may be used to obtain faster algorithms for the polynomial kernel. Namely, faster processes are obtained for kernel support vector machines (VMs), low rank approximation and approximate kernel principal component analysis (PCA), and approximate principal component regression (PCR).

One or more embodiments may employ the system 100 for regression applications involving, biological, behavioral and social sciences, trend estimations, epidemiology, finance, economics, environmental science, astronomy, bioinformics, medicine, engineering, control theory, image analysis, computer science, Internet analysis, data analysis, etc.

Figure 2:
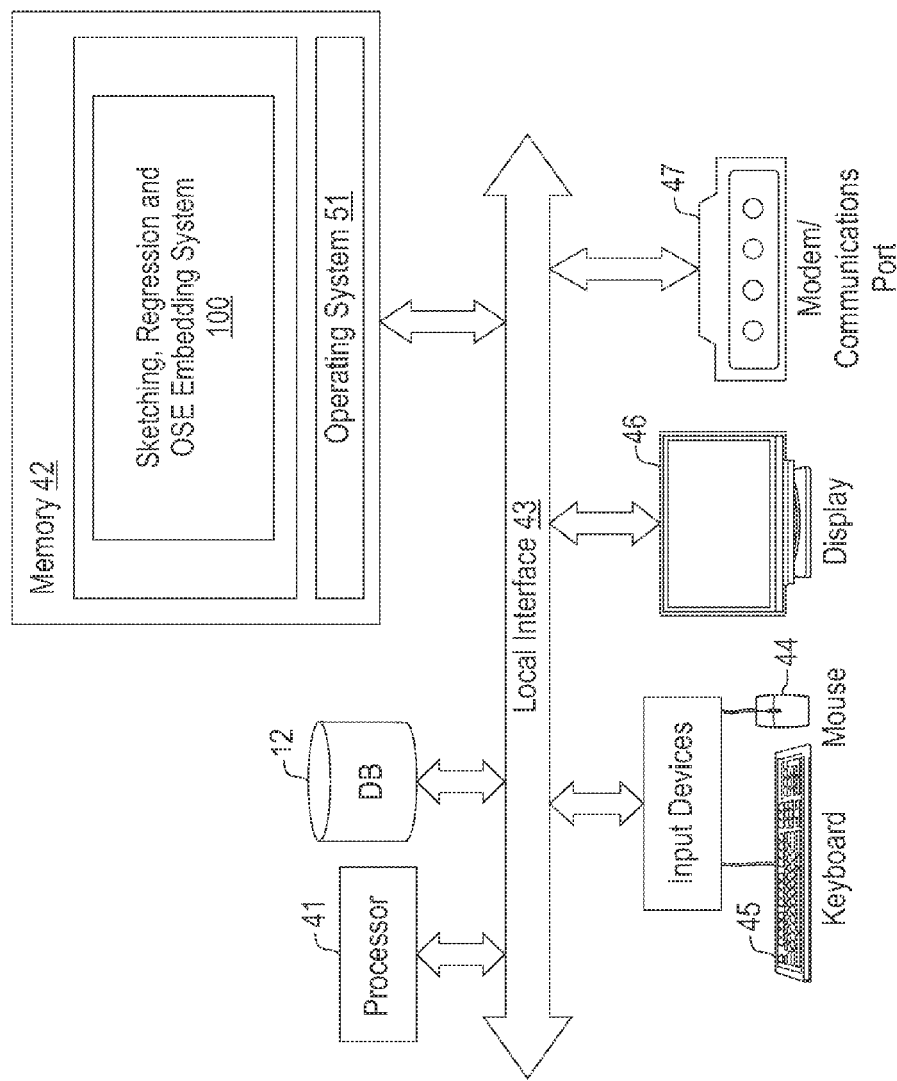
FIG. 2 is a block diagram illustrating an example of a server including a system utilizing sketching for M-estimators for performing regression and OSE embedding, according to an embodiment of the present invention, as shown in FIG. 1.

Illustrated in FIG. 2 is a block diagram demonstrating an example of server 11, as shown in FIG. 1, utilizing the system 100 according to an embodiment of the present invention. The server 11 includes, but is not limited to, PCs, workstations, laptops, PDAs, palm devices, and the like. The processing components of the third party computer systems are similar to that of the description for the server 11 (FIG. 2).

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the search system 100 of the present invention. The system 100 comprises functional components and process blocks described further below.

The operating system 51 essentially controls the execution of other computer programs, such as the system 100, and provides scheduling, input/output control, file and data management, memory management, and communication control and related services. However, the system 100 of the present invention is applicable on all other commercially available operating systems.

The system 100 may comprise a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, starts the O/S 51, and supports the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

Figure 3:
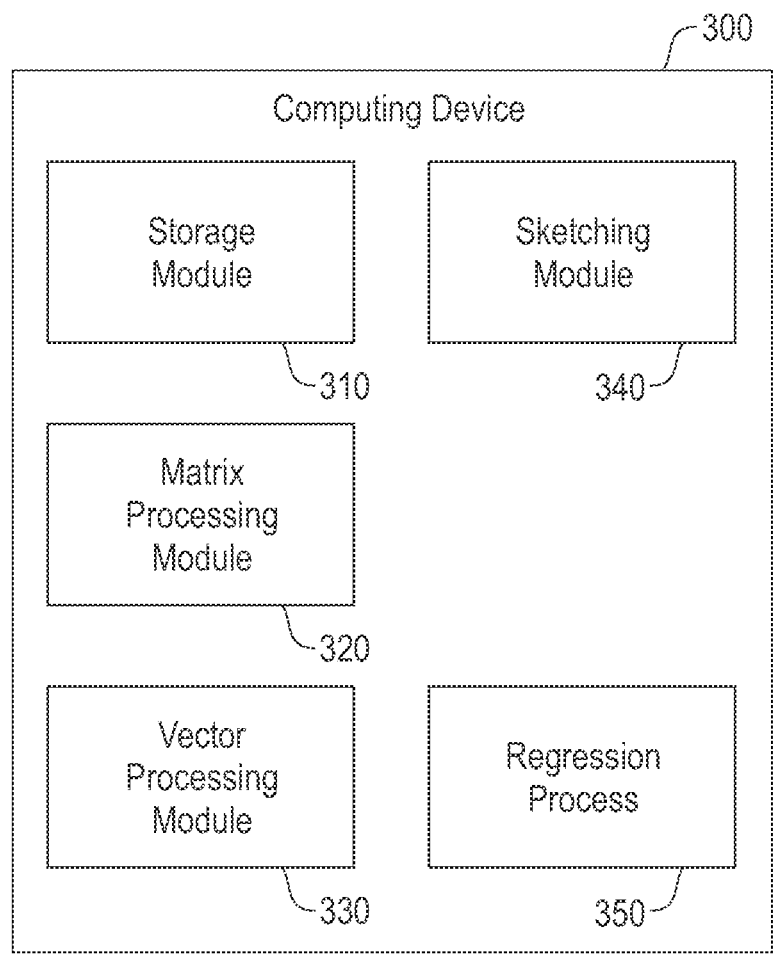
FIG. 3 illustrates a block diagram of an example computing device for sketching for M-estimators for performing regression, in accordance with an embodiment of the invention.

FIG. 3 shows an implementation of system 100 as a computing device 300 for sketching for M-estimators for performing regression and providing an oblivious subspace embedding (OSE) for embedding a space induced by a nonlinear kernel. In one embodiment, server 300 comprises a storage module 310, a matrix processing module 320, a vector processing module 330, a sketching module 340 and a regression process 350. In one embodiment, computing device 300 may extend and improve on O(nnz(A)) sketching results using the sketching module 340, matrix processing module 320, vector processing module 330 and the regression process 350 by giving a single sketching matrix construction, which is referred to herein as an M-sketch, that encompasses not only the $l_2$ (linear regression) and $l_1$ (robust regression) cases, but also the general category of statistical M-estimators, which seek to combine the insensitivity to outliers of $l_1$ regression with the low variance of $l_2$ regression. In one embodiment, the estimators are specified by a cost or measure function $G: \mathbb{R} \mapsto \mathbb{R}^+$, where $G(x)=G(-x)$, $G(0)=0$, and G is non-decreasing in $|x|$. The result is a new "norm" $\|y\|_G = \Sigma_{i \in [n]} G(y_i)$. It should be noted that in general, the functions $\|\|_G$ are not true norms, but are sometimes referred to as such herein. In one embodiment, the M-sketch is constructed independently of G, and the same sketch may be used for all G. Thus, the input from the storage module 310 may be sketched by the sketching module 340, and a particular choice of a penalty function is determined later by the regression process 350.

In one example, the Huber norm is specified by a parameter $\tau>0$, and its measure function H is given by $$H(a) \equiv \begin{cases} a^2/2\tau & \text{if } |a| \leq \tau \\ |a| - \tau/2 & \text{otherwise} \end{cases},$$

combining an $l_2$-like measure for small x with an $l_1$-like measure for large x. In one embodiment, the sketching module 340 provides an M-sketching scheme that comprises a sketching matrix $S \in \mathbb{R}^{t \times n}$ and the vector processing module provides a scaling vector $w \in \mathbb{R}^t$. In one example, for $z \in \mathbb{R}^t$, let $\|z\|_{G,w}$ denote $\Sigma_{i \in [t]} w_i G(z_i)$. In one embodiment, the M-sketch SA of the matrix A has the property that $\|SAx\|_{G,w} \approx \|Ax\|_G$, under conditions that are enough to show that the G-regression problem $\min_{x \in \mathbb{R}^d} \|Ax-b\|_G$ may be reduced in O(nnz(A)) time to the solution of a similar kind of problem $\min_{x \in \mathbb{R}^d} \|S(Ax-b)\|_{G,w}$ (with a side constraint), yielding an O(log n) approximation with constant probability over the random choice of S. In one example embodiment, the scaling vector w is chosen deterministically by the vector processing module 330.

In one example embodiment, the regression process 350 changes the measure on SAx from $\|SAx\|_{G,w}$ to a "clipped" version $\|\|_{Gc,w}$, in which only some of the larger coordinates of the sketch vector SAx are used when evaluating the norm. This variation allows a sketching process implemented by the sketching module 340 that provides a constant-factor approximation to $\min_x \|Ax-b\|_G$ with constant probability.

In one example, additional conditions on the function G beyond symmetry and monotonicity may be applied, such as that it grows no faster than quadratically in x, and no slower than linearly. Subquadratic growth is appropriate for robust regression, to reduce the effect of large values in the residual Ax-b, relative to their effect in least-squares. Almost all proposed M-estimators satisfy these conditions. The latter linear lower bound on the growth of G holds for all convex G, and many M-estimators have convex G. Moreover, the convexity of G implies the convexity of $\|\|_G$, which is needed for computing a solution to the minimization problem in polynomial time. Convexity also implies significant properties for the statistical interpretation of the results, such as consistency and asymptotic normality. In one embodiment, G is not required to be convex for sketching results from the sketching module 340. Some M-estimators are not convex.

Therefore, in one embodiment the regression process 350 reduces a large non-convex problem, $\min_x \|Ax-b\|_G$, to a smaller non-convex problem $\min_x \|S(Ax-b)\|_{G,w}$ of a similar kind. The linear growth lower bound implies that is it unable to apply sketching by the sketching module 340 to some proposed M-estimators; for example, the "Tukey" estimator, whose G function is constant for large argument values, is not included in results. However, in one or more embodiments, the regression process 350 may get close, in the sense that at the cost of more computation, G functions that grow arbitrarily slowly are handled by the regression process 350.

In one or more embodiments, the regression process 350 obtains optimal O(nnz(A)+poly(d log n)) time approximation processes for the M-estimators, and the sketch non-trivially reduces the dimension of any of these estimators other than the $l_p$-norms (which are a special case of M-estimators). With conventional regression algorithms, for the $L_1$-$L_2$ estimator in which $G(x)=2(\sqrt{1+x^2/2}-1)$, the Fair estimator in which $$G(x) = c^2 \left[ \frac{|x|}{c} - \log\left(1 + \frac{|x|}{c}\right) \right],$$

or the Huber estimator, no dimensionality reduction for the regression problem is known.

In one embodiment, for general M-estimators, the regression process 350 provides constant-factor approximations for O(nnz(A)+poly(d log n))-time one-pass implementations. In one embodiment, for the case of the Huber norm, a sampling scheme based on a combination of Huber's $l_1$ and $l_2$ properties may be used to obtain an implementation yielding an $\epsilon$-approximation with respect to the Huber norm of the residual. The Huber norm is of particular interest, because it is popular and recommended for many situations as it is robust in a certain sense, and because it has the useful computational and statistical properties implied by the convexity and smoothness of its defining function. The smoothness makes it differentiable at all points, which can lead to computational savings over $l_1$, while enjoying the same robustness properties with respect to outliers. Additionally, $l_1$ for instance, treats small residuals "as seriously" as large residuals, whereas it is often more appropriate to have robust treatment of large residuals and Gaussian treatment of small residuals.

In one embodiment, the M-sketch yields an improved $l_1$ subspace embedding than conventional regression processes. For $G(x)=|x|$, the M-sketch value may be denoted as $\Sigma_{i\in[t]} w_i |z_i| = \|D(w)z\|_1$, where $D(w)$ is the diagonal matrix W with $W_{ii}=w_i$; for $G(x)=|x|$, $\|Sy\|_{G,w}=\|D(w)Sy\|_G=\|D(w)Sy\|_1$. In one embodiment, with constant probability, the M-sketch SA has $\Omega(1)\|Ax\|_1 \leq \|D(w)SAx\|_1 \leq O(d)\|Ax\|_1$, for all $x\in \mathbb{R}^d$, and hence has distortion O(d).

One or more embodiments using the regression process 350 have results involving a sketching dimension that is polynomial in d. In one example embodiment, with a sketching dimension that is $poly(d/\epsilon)^{1/\epsilon}$, M-sketches have the dilation bound $\|D(w)Sy\|_1 \leq (1+\epsilon)\|y\|_1$ for a single vector y, with constant probability. Together with the contraction bound $\|D(w)Sy\|_1 \geq (1-\epsilon)\|y\|_1$, this is an improvement over a construction due to Indyk, for which the probability of success is $\epsilon$. In one embodiment, the results for $l_1$ are built on bounds on the contraction and dilation of $D(w)S$, based on theorems that state that $\|D(w)SAx\|_1$ will not be too much smaller than $\|Ax\|_1$, with high probability, and cannot be too much larger, with constant probability.

In one embodiment, the sketching module 340 provides the M-sketch that is novel for $l_1$, because unlike many conventional sketching schemes for $l_1$, the sketching module 340 does not use continuous random variables such as Cauchy or exponential. It should be noted that M-sketches do involve random variables that, like Cauchy, have an undefined expectation. It should also be noted that although there are sketches in the streaming literature for estimating $l_1$ values with sign ($\pm 1$) random variables, the conventional techniques use operations such as the median to achieve high probability results (which is needed in one direction for regression) and which do not make them amenable to optimization.

In one embodiment, the sketching module 340 interacts with the matrix processing module 320 and the vector processing module 330 for implementing a variant construction, comprising a sequence of sketching matrices $S_0, S_1, \ldots S_{h_{max}}$, for a parameter $h_{max}$, each comprising a block of rows of the sketching matrix:

$$S \equiv \begin{bmatrix} S_0 \\ S_1 \\ S_2 \\ \vdots \\ S_{h_{max}} \end{bmatrix}.$$

When applied to vector $y\in \mathbb{R}^n$, each $S_h$ ignores all but a subset $L_h$ of $n/b^h$ entries of y, where b>1 is a parameter, and where those entries are chosen uniformly at random (i.e., $S_h$ may be factored as $S'_h S''_h$, where $S''_h \in \mathbb{R}^{n/b^h \times n}$ samples row i of A by having column i with a single 1 entry, and the rest zero, and $S''_h$ has only $n/b^h$ nonzero entries).

In one embodiment, each $S_h$ implements a particular sketching scheme from the sketching module 340 referred to as COUNT-SKETCH on its random subset. COUNT-SKETCH splits the coordinates of y into groups ("buckets") at random, and adds together each group after multiplying each coordinate by a random $\pm 1$; each such sum constitutes a coordinate of $S_h y$. COUNT-SKETCH has been shown to be a good subspace embedding for $l_2$, implying here that the matrix $S_0$, which applies to all the coordinates of y=Ax, has the property that $\|S_0 Ax\|_2$ is a good estimator for $\|Ax\|_2$ for all $x\in \mathbb{R}^d$; in particular, each coordinate of $S_0 y$ is the magnitude of the $l_2$ norm of the coordinates in the contributing group.

In one embodiment, the sketching module 340 provides construction, based on $l_2$ embeddings, that are suitable for $l_1$, with $\|D(w)SAx\|_1$ provided as an estimate of $\|Ax\|_1$, where M-sketch is effective for that norm. In one example, an intuition is derived from considering the matrix $S_{h_{max}}$ for the smallest random subset $L_{h_{max}}$ of y=Ax to be sketched; one can think of $S_{h_{max}} y$ as one coordinate of y=Ax, chosen uniformly at random and sign-flipped. The expectation of $\|S_{h_{max}} y\|_1$ is $\Sigma_{i\in[n]} \|y_i\|_2/n = \|y\|_1/n$; with appropriate scaling from D(w), that smallest random subset yields an estimate of $\|y\|_1 = \|Ax\|_1$ (this scaling is where the values w are needed). The variance of this estimate is too high to be useful, especially when the norm of y is concentrated in one coordinate, say $y_1=1$, and all other coordinates zero. For such a y, however, $\|y\|_2=\|y\|_1$, so the base level estimator $\|S_0 y\|_2$ provides a good estimate. On the other hand, when y is the vector with all coordinates 1/n, the variance of $\|S_{\log_b n} y\|_1$ is zero, while $\|S_0 y\|_2 = \|y\|_2$ is quite inaccurate as an estimator of $\|y\|_1$. So in these extreme cases, the extreme ends of the M-sketch are effective. The intermediate matrices $S_h$ of the M-sketch serve to help with less extreme cases of y-vectors.

In one embodiment, another intuition about the usefulness of the M-sketch for robust estimation is derived from considering data A and b coming from a dataset (from the storage module 310) with inliers and outliers: that is, there is $x_o$ so that for most $i \in [n]$, $A_{i:}x_o - b_i$ is very small, where $A_{i:}$ denotes the i'th row of A, but for a few $i \in [n]$, $A_{i:}x_o - b_i$ is very large, so that $x_o$ is not a minimizer of $\|Ax-b\|_1 = \Sigma_i |A_{i:}x-b_i|$. In one embodiment, the sketching module 340, in constructing M-sketch, may determine that it may be likely that for several of the $S_h$, the random subset $L_h$ includes none of the coordinates in the small set corresponding to outlier residuals, so that $\|D(w)S(Ax-b)\|_1 = \Sigma_h \|D(w_h)S_h(Ax-b)\|_1$ has many contributing terms for which the outliers have no effect. In one embodiment, the vector processing module 330 builds the scaling vector w so that the weighted contributions from each $S_h$ are roughly equal; this reduces the effect of the outliers, and shift the solution toward $x_o$.

In one embodiment, the regression process 350, for the Huber estimator, involves importance sampling of the ($A_{i:}$, $b_i$), where a sampling matrix S' is obtained such that $\|S'(Ax-b)\|_{H,w}$ is a useful approximation to $\|Ax-b\|_H$. The sampling probabilities are based on a combination of the $l_1$ leverage score vector $u \in \mathbb{R}^n$, and the $l_2$ leverage score vector $u' \in \mathbb{R}^n$. In on embodiment, the regression process 350 uses the $l_1$ vector u from the vector processing module 330 to obtain good sampling probabilities for $l_1$ regression, and similarly for u' and $l_2$. Since the Huber measure has a mixed $l_1/l_2$ character, a combination of $l_1$ and $l_2$ scores are used to obtain good sampling probabilities for Huber. In one embodiment, the Huber norm of a vector is bounded in terms of n, $\tau$, and its $l_1$ and $l_2$ norms, and leads to a recursive sampling process.

In one or more embodiments, the general structure of the arguments is to show, as discussed above, that for a fixed $x \in \mathbb{R}^d$ there are bounds on:

contraction, so with high probability, $\|SAx\|_{G,w}$ is not too much smaller than $\|Ax\|_G$; and dilation, so with constant probability, $\|SAx\|_{G,w}$ is not too much bigger than $\|Ax\|_G$. The asymmetry in probabilities means that some results are out of reach, but still allows approximation processing by the regression module 350 for $\min_x \|Ax-b\|_G$. (the distinction is blurred between applying S to A for vectors $x \in \mathbb{R}^d$, and to [A b] for vectors [x-1]). If the optimum $x_{OPT}$ for the original problem has $\|S(Ax_{OPT}\ b)\|_G$ that is not too large, then it will be a not-too-large solution for the sketched problem $\min_x \|S(Ax-b)\|_{G,w}$. If contraction bounds hold with high probability for a fixed vector Ax, then a standard argument shows that they hold for all x; thus, there will be no x that gives a good, small $\|S(Ax-b)\|_{G,w}$ and bad, large $\|Ax-b\|_G$.

In one embodiment, the contraction and dilation bounds are shown on a fixed vector $y \in \mathbb{R}^n$ by the vector module 330 splitting up the coordinates of y into groups ("weight classes") of roughly equal magnitude. In one embodiment, a weight class W is then analyzed by the regression process 350 with respect to its cardinality: there will be some random subset ("level") $L_{\hat{h}}$ for which $|W \cap L_{\hat{h}}|$ is small relative to the number of rows of $S_{\hat{h}}$ (each row of $S_{\hat{h}}$ corresponds to a bucket, as an implementation of COUNT-SKETCH), and therefore the members of W are spread out from each other, in separate buckets. This implies that each member of W makes its own independent contribution to $\|Sy\|_{G,w}$, and therefore that $\|Sy\|_{G,w}$ will not be too small.

Also, the level $L_{\hat{h}}$ is chosen by the regression process 350 such that the expected number of entries of the weight class is large enough that the random variable $|W \cap L_{\hat{h}}|$ is concentrated around its mean, and hence this contribution from W is well-behaved.

In one embodiment, to show that $\|Sy\|_{G,w}$ will not be too big, it may be shown that W will not contribute too much to levels other than the "Goldilocks" level $L_{\hat{h}}$: for $h < \hat{h}$, for which $|L_h \cap W|$ is expected to be large, the fact that members of $W \cap L_h$ will be crowded together in a single bucket implies they will cancel each other out, roughly speaking; or more precisely, the fact that the COUNT-SKETCH buckets have an expectation that is the $l_2$ norm of the bucket entries implies that if a bucket contains a large number of entries from one weight class, those entries will make a lower contribution to the estimate $\|Sy\|_{G,w}$ than they did for $L_{\hat{h}}$. In one embodiment, for h a bit bigger than $\hat{h}$, $W \cap L_h$ will likely be empty, and W will make no contribution to $\|S_h y\|$.

One or more embodiments may use the matrix processing module 320, the vector processing module 330 and the sketching module 340 to provide subspace embedding for polynomial kernel maps, which may be further used by the regression process 350. Consider the polynomial kernel of degree q (a positive real number) defined as $k(x, y) = (\langle x, y \rangle + c)^q$ for some constant $c \geq 0$. Without loss of generality it may be assumed henceforth that $c = 0$ since the more general case can be reduced to it by adding a coordinate of value $\sqrt{c}$ to all of the data points. In one example, let $\phi(x)$ denote the function that maps a d-dimensional vector x to the $d^q$-dimensional vector formed by taking the product of all subsets of q coordinates of x, and let $\phi(A)$ denote the application of $\phi$ to the rows of A by the vector processing module 330 and the matrix processing module 320. In one example, $\phi$ is the map that corresponds to the polynomial kernel, that is $k(x, y) = \langle \phi(x), \phi(y) \rangle$, so learning with the polynomial kernel corresponds to using $\phi(A)$ instead of A.

In one embodiment, the sketching module 340 designs a distribution over $d^q \times O(3^q n^2/\epsilon^2)$ sketching matrices S so that the mapping $\phi(A) \cdot S$ may be computed in $O((A)q) + (3^q n/\epsilon)$ time, where (A) denotes the number of non-zero entries of A. Further, with constant probability arbitrarily close to 1, for all n-dimensional vectors z, $\|z \cdot \phi(A) \cdot S\|_2 = (1 \pm \epsilon) \|z \cdot \phi(A)\|_2$, that is, the entire row-space of $\phi(A)$ is approximately preserved.

In one embodiment, the sketching module 340 may implement different applications, such as SVM, approximate kernel PCA, PCR, etc. In one example, an n×k matrix V with orthonormal columns spans a rank-k (1+)-approximation of an n×d matrix A if $\|A - VV^T A\|_F \leq (1+\epsilon) \|A - A_k\|_F$. In one embodiment, the results from the sketching module 340 for a constant degree q:

For polynomial kernel SVM, when $d \gg n$, existing algorithms would either take $O(dn^2)$ time to form the n×n Gram matrix $\phi(A) \phi(A)^T$, or at least $d^q$ time to compute $\phi(A)S$ for a sketching matrix S. Once these are computed, the SVM can be solved in $(n/\epsilon)$ time using standard methods. In contrast, in one embodiment the process implemented by the sketching module 340 takes $O((A)) + (n/\epsilon)$ time, which improves the leading order term from $O(dn^2)$ to $O((A))$, the latter always being at most $O(nd)$ but can be significantly smaller for sparse matrices.

In $O((A)) + n \cdot (k/)$ time the matric processing module 320 computes an n×k matrix V with orthonormal columns for which $\|\phi(A) - VV^T \phi(A)\|_F \leq (1+) \|\phi(A) - [\phi(A)]_k\|_F$, where $[\phi(A)]_k$ denotes the best rank-k approximation to φ(A). The k-dimensional subspace V of $\mathbb{R}^n$ can be thought of as an approximation to the top k left singular vectors of φ(A).

Once the sketching module 340 determines the subspace V, a low rank approximation to φ(A) is obtained. To do this, in one embodiment the sketching module 340 samples a subset R of (k/) rows of φ(A) according to the leverage scores of V, obtaining a (1+) rank-k approximation to φ(A) given by V·U·R, where U is a k×(k/) matrix. Here the row space of R contains a good approximation to the span of the top k principal components of φ(A). In one example, it is desired to represent this matrix implicitly, since otherwise R would have $d^q$ columns. This is possible by storing the sampled rows $A_i$ rather than the sampled rows φ($A_i$). In one embodiment, the sketching module 340 obtains three matrices V, U, and R from the matric processing module 320, for which $\|\phi(A)-V\cdot U\cdot \phi(R)\|_F \leq (1+)\|\phi(A)-[\phi(A)]_k\|_F$. This representation is useful, since given a point y∈$\mathbb{R}^d$, the sketching module 340 can compute φ(R)·φ(y) quickly using the kernel trick. The total time to compute the low rank approximation is O((A))+(n+d)·(k/). This is considerably faster than standard kernel PCA which would need O($n^2$ d) time to compute the Gram matrix φ(A)·φ(A)$^T$.

The subspace V can be used to regularize and speed up various learning processes with the polynomial kernel. In one example, using the regression process 350 the subspace V may be used to solve regression problems of the form $\min_x \|Vx-b\|_2$, an approximate form of principal component regression. This can serve as a form of regularization, which is required as the problem $\min_x \|(A)x-b\|_2$ is underdetermined. A popular alternative form of regularization is to use kernel ridge regression, which requires O($n^2$d) operations. As(A) ≤nd, one or more embodiments using the regression process 350 are faster.

For sketching polynomial kernels, the TensorSketch algorithm is well-known. TensorSketch combines the earlier CountSketch with a fast Fourier transform (FFT) in a clever way. What was not known about TensorSketch, which is crucial in order to use it as an OSE for applications with one or more embodiments, is whether it can be used to approximately preserve entire subspaces of points. Indeed, a fixed point v∈$\mathbb{R}^d$ has the property that for the TensorSketch sketching matrix S, $\|\phi(v)\cdot S\|_2=(1\pm)\|\phi(v)\|_2$ with constant probability. To obtain a high probability bound using their results, a median of several independent sketches may be taken. Given a high probability bound (1−exp(−n)), one can use a net argument to show that the sketch is correct for all vectors v in an n-dimensional subspace of $\mathbb{R}_d$. The median operation results in a non-convex embedding, and it is not clear how to efficiently solve optimization problems in the sketch space with such an embedding. Moreover, the fact that n independent sketches are needed to achieve probability 1−exp(−n) means the running time will be at least n·(A), whereas one or more embodiments only seek an (A) time.

Conventional applications show that CountSketch can be used to provide a subspace embedding, that is, simultaneously for all v∈V, $\|\phi(v)\cdot S\|_2=(1\pm)\|\phi(v)\|_2$. TensorSketch can be seen as a very restricted form of CountSketch, where the additional restrictions enable its fast running time on inputs which are tensor products. In particular, the hash functions in TensorSketch are only 3-wise independent. CountSketch still provides a subspace embedding if the entries are chosen from a 4-wise independent distribution.

It should be noted that previous work on sketching the polynomial kernel suffers from the drawback described above, that is, it provides no provable guarantees for preserving an entire subspace, which is needed, e.g., for low rank approximation. This is true even of the sketching methods for polynomial kernels that do not use TensorSketch, as it only provides tail bounds for preserving the norm of a fixed vector, and has the aforementioned problems of extending it to a subspace, i.e., boosting the probability of error to be enough to union bound over net vectors in a subspace would require increasing the running time by a factor equal to the dimension of the subspace.

An unusual aspect is that for a TensorSketch matrix S can compute φ(A)·S very efficiently. However, computing S·φ(A) is not known to be efficiently computable, and indeed, for degree-2 polynomial kernels this can be shown to be as hard as general rectangular matrix multiplication. In general, even writing down S·φ(A) would take a prohibitive $d^q$ amount of time. Therefore, in one embodiment, the sketching module 340 is designed to only sketch on one side of φ(A).

The goal in random features maps is to construct randomized feature maps Ψ(•) so that the Euclidean inner product <ΨP(u),Ψ(v)> closely approximates the value of k (u, v) where k is the kernel; the mapping Ψ is dependent on the kernel. Theoretical analysis in this line of research has focused so far on showing that <Ψ(u),Ψ(v)> is indeed close to k (u, v). This is also the kind of approach that is used to analyze TensorSketch. The problem with this kind of analysis is that it is hard to relate it to downstream metrics like generalization error. In contrast, in one embodiment the sketching module 340 based on OSEs provides a computational framework for analyzing the mappings, to reason about their downstream use, and to utilize various tools from numerical linear algebra in conjunction with them.

In one example, the CountSketch data structure is described as follows. Let B be the dimension of CountSketch, which is the number of its hash buckets. When applied to d-dimensional vectors v, the data structure is specified by a 2-wise independent hash function h: [d]→[B] and a 2-wise independent sign function s: [d]→−1, +1. The value in the i-th bucket of the data structure, for i=1, 2, . . . , B, is given by $\Sigma_{j|h(j)=i} s(j)v_j$. CountSketch can be represented as a B×d matrix in which the j-th column contains a single non-zero entry s(j) in the h(j)-th row.

The TensorSketch data structure is described as follows. Suppose a point v∈$\mathbb{R}^d$ and so φ(v)∈$\mathbb{R}^{d^q}$ are given. In one example, q 3-wise independent hash functions $h_1, \ldots, h_q$: [d]→[B], and q 2-wise independent sign functions $s_1, \ldots, s_q$: [d] {+1, 1} are chosen. The hash function H: [$d^q$]→[B] and sign function S: [$d^q$]→{+1, −1} are defined as follows:

$$H(i_1, \ldots, i_q) = h_1(i_1) + h_2(i_2) + \ldots + h_q(i_q) \mod B,$$

and $$S(i_1, \ldots, i_q) = s_1(i_1) \cdot s_2(l_1) \ldots s_q(i_q).$$

It is well-known that if H is constructed this way, then it is 3-wise independent. Unlike a conventional technique, which implemented H as a 2-wise independent, in the following a stronger property of H is needed. To hash the point v, TensorSketch computes the polynomials $$p_l(x) = \sum_{i=0}^{B-1} x^i \sum_{j|h_l(j)=i} v_j \cdot s_l \qquad (j),$$

for l=1, 2, . . . , q. A calculation shows $$\Pi_{l=1}^q (x) \bmod(x^B-1) = \sum_{i=0}^{B-1} x^i \sum_{(j_1, \ldots, j_q)|H(j_1, \ldots, j_q)=i} v_{j_1} \cdots v_{j_q} S(j_1, \ldots, j_q)$$

that is, the product of the q polynomials can be viewed as a CountSketch data structure applied to the vector $v^{\otimes q}$ with hash function H and sign function S.

A key insight of Pagh is that this product of polynomials can be computed in O(qB log B) time using the Fast Fourier Transform. As it takes O(q(v)) time to form the q polynomials, the overall time to compute TensorSketch(v) is O(q((v)+B log B)). While an error analysis of TensorSketch is provided in the literature, it is only for a single point, and does not apply to properties of subspaces. In one or more embodiments, a new analysis of TensorSketch is provided for subspaces.

In one example embodiment, for OSE, let Π be the m×d$^q$ matrix such that TensorSketch(v) is $\phi(v)\Pi^T$, where $\phi(v)$ is the row feature vector in d$^q$. It will be shown that $\Pi^T$ is an oblivious subspace embedding for subspaces in d$^q$ for appropriate values of m. Notice that Π has exactly one non-zero entry per column. The index of the non-zero in the column $(i_1, \ldots, i_q)$ is $H(i_1, \ldots, i_q) = \sum_{j=1}^q h_j(i_j) \bmod m$. Let $\delta_{i,j}$ be the indicator random variable of whether $\Pi_{i,j}$ is non-zero. The signs of the non-zero entry in column $(i_1, \ldots, i_q)$ is $S(i_1, \ldots, i_q) = \Pi_{j=1}^q s_j(i_j)$. The following lemmas show that Π can be used to approximate a matrix product and is a subspace embedding, according to one embodiment. Let A and B be matrices with d$^q$ rows. For m=Θ(3$^q$/($\epsilon^2\delta$)):

$$Pr[\|A^T\Pi^T\Pi B - A^TB\|_F^2 \leq \epsilon^2 \|A\|_F^2 \|B\|_F^2] \geq 1-\delta.$$

Proof. Let C=A$^T$Π$^T$ΠB. Then $$C_{u,u'} = \sum_{t=1}^m \sum_{i,j\in[d]^q} S(i)S(j)\delta_{t,i}\delta_{t,j}A_{i,u}B_{j,u'} = \sum_{t=1}^m \sum_{i\neq j\in[d]^q} S(i)S(j)\delta_{t,i}\delta_{t,j}A_{i,u}B_{j,u'} + (A^TB)_{u,u'}.$$

Thus, $[C_{u,u'}] = (A^TB)_{u,u'}$. Next, the following is analyzed $[((C-A^TB)_{u,u'})^2]$. This leads to:

$$((C-A^TB)_{u,u'})^2 = \sum_{t_1,t_2=1}^m \sum_{i_1\neq j_1, i_2\neq j_2 \in [d]^q} S(i_1)S(i_2)S(j_1)S(j_2) \cdot \delta_{t_1,i_1}\delta_{t_1,j_1}\delta_{t_2,i_2}\delta_{t_2,j_2} \cdot A_{i_1,u}A_{i_2,u}B_{j_1,u'}B_{j_2,u'}.$$

For a term in the summation on the right hand side to contribute to $[((S-A^TB)_{u,u'})^2]$, it must be the case that $[S(i_1)S(i_2)S(j_1)S(j_2)]=1$. In other words, in each of the q coordinates, the 4 coordinates of $i_1, i_2, j_1, j_2$ must form matching pairs. In one example embodiment, let $S_1$ be the set of coordinates where $i_1$ and $i_2$ agrees. Note that $j_1$ and $j_2$ must also agree in all coordinates in $S_1$. Let $S_2 \subset [q]\setminus S_1$ be the coordinates among the remaining where $i_1$ and $j_1$ agrees. Finally, let $S_3=[q]\setminus(S_1\cup S_2)$. All coordinates in $S_3$ of $i_1$ and $j_2$ must agree. It can be rewritten as $i_1=(a, b, c), i_2=(a, e, f), j_1=(g, b, f), j_2=(g, e, c)$ where a, g∈[d]$^{s_1}$, b, e∈[d]$^{s_2}$, c, f∈[d]$^{s_3}$.

First it is shown that the contribution of the terms where $i_1=i_2$ or $i_1=j_2$ is bounded by $$\frac{2\|A_u\|^2 \|B_{u'}\|^2}{m},$$

where $A_u$ is the uth column of A and $B_{u'}$ is the u'th column of B. Indeed, consider the case $i_1=i_2$. As observed before, $j_1=j_2$ must be used to get a non-zero contribution. Note that if $t_1 \neq t_2$, one always has $\delta_{t_1,i_1}\delta_{t_2,i_2}=0$ as H($i_1$) cannot be equal to both $t_1$ and $t_2$. Thus, for fixed $i_1=i_2, j_1=j_2$, $$\left[\sum_{t_1,t_2=1}^m S(i_1)S(i_2)S(j_1)S(j_2) \cdot \delta_{t_1,i_1}\delta_{t_1,j_1}\delta_{t_2,i_2}\delta_{t_2,j_2} \cdot A_{i_1,u}A_{i_2,u}B_{j_1,u'}B_{j_2,u'}\right] = \left[\sum_{t_1=1}^m \delta_{t_1,i_1}^2 \delta_{t_1,j_1}^2 A_{i_1,u}^2 B_{j_1,u'}^2\right] = \frac{A_{i_1,u}^2 B_{j_1,u'}^2}{m}.$$

Summing over all possible values of $i_1, j_1$, one embodiment obtains the desired bound of $$\frac{\|A_u\|^2 \|B_{u'}\|^2}{m}.$$

The case $i_1=j_2$ is analogous.

In one embodiment, the contribution of the terms are computed by the sketching module 340, where $i_1 \neq i_2, j_1, j_2$ i.e., there are at least three (3) distinct numbers among $i_1, i_2, j_1, j_2$. Notice that $$[\delta_{t_1,i_1}\delta_{t_1,j_1}\delta_{t_2,i_2}\delta_{t_2,j_2}] \leq \frac{1}{m^3}.$$

For fixed $i_1, j_1, i_2, j_2$, there are m$^2$ choices of $t_1, t_2$ so the total contribution to the expectation from terms with the same $i_1, j_1, i_2, j_2$ is bounded by $$m^2 \cdot \frac{1}{m^3} \cdot |A_{i_1,u}A_{i_2,u}B_{j_1,u'}B_{j_2,u'}| = \frac{1}{m}|A_{i_1,u}A_{i_2,u}B_{j_1,u'}B_{j_2,u'}|.$$

Therefore, $$[((C-A^TB)_{u,u'})^2] \leq$$

$$\frac{2\|A_u\|^2\|B_{u'}\|^2}{m} + \frac{1}{m}\sum_{partitions\,S_1,S_2,S_3} \sum_{\substack{a,g\in[d]^{s_1}\\b,e\in[d]^{s_2}\\c,f\in[d]^{s_3}}} |A_{(a,b,c),u} B_{(g,b,f),u'} A_{(a,e,f),u} B_{(g,e,c),u'}| \leq$$

$$\frac{2\|A_u\|^2\|B_{u'}\|^2}{m} + \frac{3^q}{m}\sum_{a,b,c,g,e,f} |A_{(a,b,c),u} B_{(g,b,f),u'} A_{(a,e,f),u} B_{(g,e,c),u'}| \leq$$

$$\frac{2\|A_u\|^2\|B_{u'}\|^2}{m} + \frac{3^q}{m}\sum_{g,e,f}\left(\sum_{a,b,c}A_{(a,b,c),u}^2\right)^{1/2}\left(\sum_{a,b,c}B_{(g,b,f),u'}^2 A_{(a,e,f),u}^2 B_{(g,e,c),u'}^2\right)^{1/2} =$$

$$\frac{2\|A_u\|^2\|B_{u'}\|^2}{m} + \frac{3^q\|A_u\|}{m}\sum_{g,e,f}\left(\sum_b B_{(g,b,f),u'}^2\right)^{1/2}\left(\sum_{a,c}A_{(a,e,f),u}^2 B_{(g,e,c),u'}^2\right)^{1/2},$$

where the second inequality follows from the fact that there are 3$^q$ partitions of [q] into 3 sets. The other inequalities are from Cauchy-Schwarz. Continuing to bound this expression, $$\leq \frac{2\|A_u\|^2 \|B_{u'}\|^2}{m} +$$

$$\frac{3^q \|A_u\|}{m} \sum_e \left( \sum_{b,g,f} B_{(g,b,f),u'}^2 \right)^{1/2} \left( \sum_{a,c,g,f} A_{(a,e,f),u}^2 B_{(g,e,c),u'}^2 \right)^{1/2} =$$

$$\frac{2\|A_u\|^2 \|B_{u'}\|^2}{m} + \frac{3^q \|A_u\| \cdot \|B_{u'}\|}{m} \sum_e \left( \sum_{a,f} A_{(a,e,f),u}^2 \right)^{1/2} \left( \sum_{g,c} B_{(g,e,c),u'}^2 \right)^{1/2} \leq$$

$$\frac{2\|A_u\|^2 \|B_{u'}\|^2}{m} + \frac{3^q \|A_u\| \cdot \|B_{u'}\|}{m} \left( \sum_{a,e,f} A_{(a,e,f),u}^2 \right)^{1/2} \left( \sum_{g,e,c} B_{(g,e,c),u'}^2 \right)^{1/2} =$$

$$\frac{(2+3^q) \|A_u\|^2 \|B_{u'}\|^2}{m},$$

where the inequalities are applications of the Cauchy-Schwarz inequality.

Combining the above bounds, one has $$\left[ ((C - A^T B)_{u,u'})^2 \right] \leq \frac{(2+3^q) \|A_u\|^2 \|B_{u'}\|^2}{m}.$$

For $m \geq (2+3^q)/(\epsilon^2 \delta)$, by the Markov inequality, $\|A^T \Pi^T \Pi B - A^T B\|_F^2 \leq \epsilon^2$ with probability $1-\delta$. Consider a fixed k-dimensional subspace V. If $m = \Theta(k^2 3^q / (\epsilon^2 \delta))$, then with probability at least $1-\delta$, $\|\Pi x\| = (1 \pm \epsilon) \|x\|$ simultaneously for all $x \in V$. Let B be an $d^q \times k$ matrix whose columns form an orthonormal basis of V. Thus, one has $B^T B = I_k$ and $\|B\|_F^2 = k$. The condition that $\|\Pi x\| = (1 \pm \epsilon) \|x\|$ simultaneously for all $x \in V$ is equivalent to the condition that the singular values of $\Pi B$ are bounded by $1 \pm \epsilon$. For $m = \Theta(3^q / ((\epsilon/k)^2 \delta))$, with probability at least $1-\delta$, one has $$\|B^T \Pi^T \Pi B - B^T B\|_F^2 \leq (\epsilon/k)^2 \|B\|_F^4 = \epsilon^2$$

Thus, $\|B^T \Pi^T \Pi B - I_k\| \leq \|B^T \Pi^T \Pi B - I_k\|_F \leq \epsilon$. In other words, the squared singular values of $\Pi B$ are bounded by $1 \pm \epsilon$, implying that the singular values of $\Pi B$ are also bounded by $1 \pm \epsilon$.

The Support Vector Machines (SVM) problem is to find a hyperplane that maximizes the 1-norm soft margin of a set of n input points $A_1, \ldots, A_n \in \mathbb{R}^{1 \times d}$ with respective labels $y_i \in \{-1, 1\}$. In one example embodiment, first it is stated what is known for the non-kernelized version of the problem, and then the results for the polynomial kernel version of the problem are stated. In one embodiment, the sketching module 340 assumes $d \gg n$. In the non-kernelized version of the problem, if $A \in \mathbb{R}^{n \times d}$ is the matrix whose rows are the $A_1$, $Y \in \mathbb{R}^{n \times n}$ is the diagonal matrix with entries $Y_{i,i} = y_i$, and $\alpha \in \mathbb{R}^n$ is a vector of Lagrange multipliers, then the dual formulation of the SVM optimization problem is to find $\alpha$ given by the following optimization problem:

$$\max_\alpha 1^T \alpha - \frac{1}{2} \alpha^T Y A A^T Y \alpha \; subject \, to \, 1^T Y \alpha = 0; \text{ and } 0 \leq \alpha \leq C,$$

where $1^T$, 0, and C are vectors with the implied constant entry.

In one example embodiment, let $\alpha^*$ be an optimal solution of the above problem. The optimal separating hyperplane $w^*$ is given by $w^* = A^T Y \alpha^* = \Sigma_{i=1}^n y_i \alpha_i^* A_i$, and the points $A_i$ for which $\alpha_i^* > 0$ are called the support vectors. The geometric margin $\gamma^*$ is $1/\|w^*\|_2$, where it can be shown for this optimal hyperplane that $\|w^*\|_2^2 = \Sigma_{i=1}^n \alpha_i^*$. The data radius is given by $r = \min_x \max_{A_i} \|A_i - x\|_2$. The generalization performance of an SVM is typically characterized by the ratio $r/\gamma^*$. The smaller the ratio, the better.

Let $\epsilon$ be an accuracy parameter, and suppose S is a subspace embedding for the rowspace of A, that is, for all $z \in \mathbb{R}^n$, $\|zAS\|_2 = (1 \pm \epsilon) \|zA\|_2$. Suppose one replaces the matrix A in the SVM optimization problem with $\tilde{A} = AS$. Then if $\tilde{\gamma}^*$ is the margin obtained using $\tilde{A}$ and $\tilde{r}$ the radius obtained used $\tilde{A}$, then (1) $\tilde{\gamma}^* \geq (1-\epsilon) \cdot \gamma^*$, and (2) $\tilde{r} \leq (1+\epsilon) r$. One can compute $\tilde{A} = AS$ in $O((A))$ time, and the number of columns of S is $(n/\epsilon)$. It follows that $\tilde{A}$ is an $n \times (n/\epsilon)$ matrix, so the resulting SVM problem no longer depends on d, and can be solved in $(n/\epsilon)$ time using standard methods. Hence, the overall time is $O((A)) + (n/\epsilon)$ and the guarantee is that $\tilde{\gamma}^* \geq (1-\epsilon) \cdot \gamma^*$ and $\tilde{r} \leq (1+\epsilon) r$.

The difference with the polynomial kernel version of the problem is that A is replaced with $\phi(A)$ in the optimization problem, increasing the dimension to $d^q$. Note that $\alpha$ is still n-dimensional. Explicitly writing down $\phi(A)$ and then computing $\phi(A)S$ for a sketching matrix S would take at least $d^q$ time, which is intractable. One can improve this to $O(n^2 d \log q)$ time by using the kernel trick to compute $\phi(A) \phi(A)^T$. One could then solve the resulting optimization problem in $(n/\epsilon)$ time. However, if $d \gg n$, this can be quite slow. If A is sparse, then sparsity can potentially be used to compute $\phi(A) \phi(A)^T$ faster, but it is hard to give a formal statement regarding the run-time as it depends on the sparsity structure (e.g., a single dense column in A will cause $\phi(A) \phi(A)^T$ to be full).

In one embodiment, the following is provided for polynomial kernel SVM. In $O((A)q) + (3^q n/\epsilon)$ time, one can solve the SVM optimization problem on the polynomial kernel of degree q so as to obtain a hyperplane with margin $\tilde{\gamma}^* \geq (1-\epsilon) \cdot \gamma^*$ and radius $\tilde{r} \leq (1+\epsilon) r$.

Proof.

S is chosen to be a $d^q \times O(3^q n^2 / \epsilon^2)$ TensorSketch matrix. Using the fact that S provides a subspace embedding, it follows that (1) $\phi(A)S$, and (2) $\phi(A)S$ can be computed in $O(q((A) + 3^q n^3 / \epsilon^2 \log(n/\epsilon)))$ time and S has $O(3^q n^2 / \epsilon^2)$ rows, according to one embodiment.

In one embodiment, the sketching module 340 provides approximate kernel PCA and low rank approximation. In one example, an $n \times k$ matrix V with orthonormal columns spans a rank-k $(1+\epsilon)$-approximation of an $n \times d$ matrix A if $\|A - VV^T A\|_F \leq (1+\epsilon) \|A - A_k\|_F$. One example starts by developing a process for finding an $n \times k$ matrix V which spans a rank-k $(1+\epsilon)$-approximation of $\phi(A)$. In one embodiment, a process of the sketching module 340 is given as follows:

Process 1 k-Space:
1. Input: $A \in \mathbb{R}^{n \times d}$, $\epsilon \in (0,1]$, integer k.
2. Output: $V \in \mathbb{R}^{n \times k}$ with orthonormal columns which spans a rank-k $(1+\epsilon)$-approximation to $\phi(A)$.
3. Set the parameters $m = O(3^q k^2 + k/\epsilon)$ and $r = O(3^q m^2 / \epsilon^2)$.
4. Let S be a $d^q \times m$ TensorSketch and T be an independent $d^q \times r$ TensorSketch.
5. Compute $\phi(A) S$ and $\phi(A) T$.
6. Let U be an orthonormal basis for the column space of $\phi(A) \cdot S$.
7. Let W be the $m \times k$ matrix containing the top k left singular vectors of $U^T \phi(A) T$.
8. Output $V = UW$.

Before proving the correctness of the process 1 above, two key lemmas are provided. Let $S \in \mathbb{R}^{d^q \times m}$ be a randomly chosen TensorSketch matrix with $m = O(3^q k^2 + k/\epsilon)$. Let $UU^T$ be the $n \times n$ projection matrix onto the column space of φ(A)·S. Then if $[U^T \phi(A)]_k$ is the best rank-k (1+)-approximation to matrix $U^T \phi(A)$, one has:

$$\|U[U^T\phi(A)]_k - \phi(A)\|_F \le (1+O(\ ))\|\phi(A) - [\phi(A)]_k\|_F.$$

Let $UU^T$ be as above. Let $T \in \mathbb{R}^{d^q \times r}$ be a randomly chosen TensorSketch matrix with $r = O(3^q m^2/{}^2)$, where $m = O(3^q k^2 + k/)$. Suppose W is the m×k matrix whose columns are the top k left singular vectors of $U^T \phi(A) T$. Then, $$\|UWW^T U^T \phi(A) - \phi(A)\|_F \le (1 \pm)\|\phi(A) - [\phi(A)]_k\|_F.$$

For the polynomial kernel of degree q, in $O((A)q) + n \cdot (3^q k/\epsilon)$ time, the process 1 k-Space finds an n×k matrix V which spans a rank-k (1+)-approximation of φ(A). The output V=UW spans a rank-k (1+)-approximation to φ(A). It only remains to argue the time complexity. The sketches φ(A)·S and φ(A)·T can be computed in $O((A)q) + n \cdot (3^q k/)$ time by the sketching module 340. In $n \cdot (3^q k/)$ time, the matrix U can be obtained from φ(A)·S and the product $U^T \phi(A) T$ can be computed. Given $U^T \phi(A) T$, the matrix W of top k left singular vectors can be computed in $(3^q k/)$ time, and in $n \cdot (3^q k/)$ time the product V=UW can be computed. Hence the overall time is $O((A)q) + n \cdot (3^q k/\epsilon)$.

In one embodiment, a low rank approximation to φ(A) may be found as follows (Polynomial Kernel PCA and Low Rank Factorization). For the polynomial kernel of degree q, in $O((A)q) + (n+d) \cdot (3^q k/\epsilon)$ time, the sketching module 340 can find an n×k matrix V, a k×(k/ϵ) matrix U, and a (k/)×d matrix R for which $$\|V \cdot U \cdot \phi(R) - A\|_F \le (1+\epsilon)\|\phi(A) - [\phi(A)]_k\|_F.$$

The success probability of the algorithm is at least. 6. Note that it may be implied that the row space of φ(R) contains a k-dimensional subspace L with $d^q \times d^q$ projection matrix $LL^T$ for which $\|\phi(A)LL^T - \phi(A)\|_F \le (1+\epsilon)\|\phi(A) - [\phi(A)]_k\|_F$, that is, L provides an approximation to the space spanned by the top k principal components of φ(A).

In one embodiment, regularizing learning with the polynomial kernel may be provided by the sketching module 340. Consider learning with the polynomial kernel. If d<<n it might be that even for low values of q one will have $d^q >> n$. This makes a number of learning algorithms underdetermined, and increases the chance of overfitting. The problem is even more severe if the input matrix A has a lot of redundancy in it (noisy features). To address this, many learning algorithms add a regularizer, e.g., ridge terms. In one embodiment, the sketching module 340 regularizes by using rank-k approximations to the matrix (where k is the regularization parameter that is controlled by the user).

In one embodiment, two different processes that can be regularized using the sketching module 340 are provided. In one example embodiment, approximate kernel PCR is provided. If $d^q > n$ the linear regression with φ(A) becomes underdetermined and exact fitting to the right hand side is possible, and in more than one way. One form of regularization is PCR, which first uses PCA to project the data on the principal component, and then continues with linear regression in this space. In one example embodiment, the following approximate version of PCR is provided. In the approximate PCR problem (Approximate PCR), an n×d matrix A and an n×1 vector b is provided, and the goal is to find a vector $x \in \mathbb{R}^k$ and an n×k matrix V with orthonormal columns spanning a rank-k (1+)-approximation to A for which $x = \text{argmin}_x \|Vx - b\|_2$. Notice that if A is a rank-k matrix, then Approximate PCR coincides with ordinary least squares regression with respect to the column space of A. While PCR would require solving the regression problem with respect to the top k singular vectors of A, in general finding these k vectors exactly results in unstable computation, and cannot be found by an efficient linear sketch. This would occur, e.g., if the k-th singular value $\sigma_k$ of A is very close (or equal) to $\sigma_{k+1}$. In one example embodiment, the definition is relaxed to only require that the regression problem be solved with respect to some k vectors which span a rank-k (1+)-approximation to A.

In one embodiment, the following is provided for Approximate PCR. (Polynomial Kernel Approximate PCR.). For the polynomial kernel of degree q, in $O((A)q) + n \cdot (3^q k/\epsilon)$ time the sketching module 340 can solve the approximate PCR problem, namely, outputting a vector $x \in \mathbb{R}^k$ and an n×k matrix V with orthonormal columns spanning a rank-k (1+)-approximation to φ(A), for which $x = \text{argmin}_x \|Vx - b\|_2$. An n×k matrix V with orthonormal columns spanning a rank-k (1+)-approximation to φ(A) may be found in $O((A)q) + n \cdot (3^q k/\epsilon)$ time. At this point, the regression problem $\text{argmin}_x \|Vx - b\|_2$ may be determined by the regression process 350 exactly in O(nk) time since the minimizer is $x = V^T b$.

In one example embodiment, canonical correlation analysis (CCA) provides two matrices A, B and it is desired to find directions in which the spaces spanned by their columns are correlated. A formal linear algebraic definition is as follows. Let $A \in {}^{m \times n}$ and $B \in {}^{m \times l}$, and assume that p=(A)≥(B)=q. The canonical correlations $\sigma_1(A, B) \ge \sigma_2(A, B) \ge \ldots \ge \sigma_q(A, B)$ of the matrix pair (A, B) are defined recursively by the following formula:

$$\sigma_i(A, B) = \max_{x \in A_i, y \in B_i} \sigma(Ax, By) =: \sigma(Ax_i, By_i),$$

$$i = 1, \ldots, q$$

where $\sigma(u, v) = |u^T v|/(\|u\|_2 \|v\|_2)$,
$A_i = \{x : Ax \ne 0, Ax \perp \{Ax_1, \ldots, Ax_{i-1}\}\}$,
$B_i = \{y : By \ne 0, By \perp \{By_1, \ldots, By_{i-1}\}\}$.

The unit vectors $Ax_1/\|Ax_1\|_2, \ldots, Ax_q/\|Ax_q\|_2$, $By_1/\|By_1\|_2, \ldots, By_q/\|By_q\|_2$ are referred to as the canonical or principal vectors. The vectors $x_1/\|Ax_1\|_2, \ldots, x_q/\|Ax_q\|_2$, $y_1/\|By_1\|_2, \ldots, y_q/\|By_q\|_2$ are referred to as canonical weights (or projection vectors). Note that the canonical weights and the canonical vectors are not uniquely defined.

CCA finds correlations between any parts of the spectrum. Potentially, random correlation between noise might be found, skewing the results. The problem is aggravated in the kernel setting (where correlations are found between φ(A) and φ(B)): if $d^q > n$ then there is exact correlation between the subspaces. One common way to address this is to add ridge terms. In one embodiment, the sketching module 340 considers a different form of regularization: finding the correlations between the dominant subspaces of A and B (their principal components). In one example embodiment, an approximate version is introduced. In the Approximate Principal Component CCA Problem (Approximate PC-CCA), given an $n \times d_1$ matrix A and an $n \times d_2$ matrix B, the goal is to find two n×k orthonormal matrices U and V, where U spans a rank-k approximation to A and V spans a rank-k approximation to B, and output the CCA between U and V.

In one embodiment, for the polynomial kernel of degree q, in $O(((A)+(B))q) + n \cdot (3^q k/\epsilon)$ time one embodiment can solve the approximate PC-CCA problem on φ(A) and φ(B). In one example, an n×k matrix V with orthonormal columns spanning a rank-k (1+)-approximation to φ(A) can be found in $O((A) q) + n \cdot (3^q k/\epsilon)$ time, a n×k matrix U with orthonormal columns spanning a rank-k (1+)-approximation to φ(B) in $O((B)q)+n\cdot(3^q k/\epsilon)$ time. At this point, in one embodiment, the sketching module 340 computes the CCA between U and V, which amounts to computing an SVD on $U^T V$. This takes $O(nk^2)$ time.

Two sets of example embodiments using the sketching module 340 have the goal of demonstrating that the k-Space process 1 is useful as a feature extraction process. In one example, standard classification and regression datasets. In the first set of example embodiments, ordinary $l_2$ regression is compared to approximate principal component $l_2$ regression, where the approximate principal components are extracted using k-Space (RLSC is used for classification). Specifically, as explained above, one embodiment uses k-Space to compute V and then use regression on V (in one dataset we also add an additional ridge regularization) using the regression process 350. To predict, it is noticed that $V=\phi(A)\cdot S\cdot R^{-1} W$, where R is the R factor of $\phi(A)\cdot S$, so $S\cdot R^{-1}\cdot W$ defines a mapping to the approximate principal components. To predict on a matrix $A_t$ the sketching module first computes $\phi(A_t)\cdot S\cdot R^{-1}\cdot W$ (using TensorSketch to compute $\phi(A_t)\cdot S$ fast) and then multiply by the coefficients found by the regression by the regression process 350. In all the example embodiments, $\phi(\bullet)$ is defined using the kernel k (u, v)=$(u^T v+1)^3$.

k-Space can be rather expensive both in time and in memory to compute, so in one example embodiment, feature extraction using only a subset of the training set is implemented. Specifically, first the dataset is sampled and stored in the storage module 310, then k-Space is used to compute the mapping $S\cdot R^{-1}\cdot W$. This mapping is applied to the entire dataset before performing regression by the regression process 350. The results of the first example embodiment is shown in Table 1. Since k-Space is randomized, the mean and standard deviation of five (5) runs are shown in Table 1. For all datasets, learning with the extracted features yields better generalized errors than learning with the original features. Extracting the features using only a sample of the training set results in only slightly worse generalization errors.

A similar setup is used in the second set of example embodiments, now using linear SVM instead of regression (run only on the classification datasets). The results are shown in Table 2. Although the gap is smaller, it may be seen again that generally the extracted features lead to better generalization errors.

For Table 1 below: comparison of testing error with using regression with original features and with features extracted using k-Space. In Table 1, n is number of training instances, d is the number of features per instance and $n_t$ is the number of instances in the test set. "Regression" stands for ordinary $l_2$ regression. "PCA Regression" stand for approximate principal component $l_2$ regression. "Sample PCA Regression" stands approximate principal component $l_2$ regression where only $n_s$ samples from the training set are used for computing the feature extraction. In "PCA Regression" and "Sample PCA Regression" k features are extracted. In k-Space process 1, m=O(k) and r=O(k) are used with the ratio between m and k and r and k as detailed in Table 1. For classification tasks, the percent of testing points incorrectly predicted is reported. For regression tasks, $\|y_p - y\|_2 / \|y\|$ where $y_p$ is the predicted values and y is the ground truth are shown.

TABLE 1

| Dataset | Regression | PCA Regression | Sampled PCA Regression |
|---|---|---|---|
| mnist classification<br>n = 60,000,<br>d = 784<br>$n_t$ = 10,000 | 14% | Out of Memory | 7.9% ± 0.06%<br>k = 500,<br>$n_s$ = 5000<br>m/k = 2<br>r/k = 4 |
| cpu regression<br>n = 6,554,<br>d = 21<br>$n_t$ = 819 | 12% | 4.3% ± 1.0%<br>k = 200<br>m/k = 4<br>r/k = 8 | 3.6% ± 0.1%<br>k = 200,<br>$n_s$ = 2000<br>m/k = 4<br>r/k = 8 |
| adult classification<br>n = 32,561,<br>d = 123<br>$n_t$ = 16,281 | 15.3% | 15.2% ± 0.1%<br>k = 500<br>m/k = 2<br>r/k = 4 | 15.2% ± 0.03%<br>k = 500,<br>$n_s$ = 5000<br>m/k = 2<br>r/k = 4 |
| census regression<br>n = 18,186,<br>d = 119<br>$n_t$ = 2,273 | 7.1% | 6.5% ± 0.2%<br>k = 500<br>m/k = 4<br>r/k = 8<br>λ = 0.001 | 6.8% ± 0.4%<br>k = 500,<br>$n_s$ = 5000<br>m/k = 4<br>r/k = 8<br>λ = 0.001 |
| usps classification<br>n = 7,291,<br>d = 256<br>$n_t$ = 2,007 | 13.1% | 7.0% ± 0.2%<br>k = 200<br>m/k = 4<br>r/k = 8 | 7.5% ± 0.3%<br>k = 200,<br>$n_s$ = 2000<br>m/k = 4<br>r/k = 8 |

For Table 2: comparison of testing error with using SVM with original features and with features extracted using k-Space. In Table 2, n is number of training instances, d is the number of features per instance and $n_t$ is the number of instances in the test set. "SVM" stands for linear SVM. "PCA SVM" stands for using k-Space to extract features, and then using linear SVM. "Sample PCA SVM" stands for using only $n_s$ samples from the training set are used for computing the feature extraction. In "PCA SVM" and "Sample PCA SVM" k features are extracted. In k-Space process 1, m=O(k) and r=O(k) with the ratio between m and k and r and k are used as detailed in Table 2. For classification tasks, the percent of testing points incorrectly predicted is reported.

TABLE 2

| Dataset | SVM | PCA SVM | Sampled PCA SVM |
|---|---|---|---|
| mnist classification<br>n = 60,000,<br>d = 784<br>$n_t$ = 10,000 | 8.4% | Out of Memory | 6.1% ± 0.1%<br>k = 500,<br>$n_s$ = 5000<br>m/k = 2<br>r/k = 4 |
| adult classification<br>n = 32,561,<br>d = 123<br>$n_t$ = 16,281 | 15.0% | 15.1% ± 0.1%<br>k = 500<br>m/k = 2<br>r/k = 4 | 15.2% ± 0.1%<br>k = 500,<br>$n_s$ = 5000<br>m/k = 2<br>r/k = 4 |
| usps classification<br>n = 7,291,<br>d = 256<br>$n_t$ = 2,007 | 8.3% | 7.2% ± 0.2%<br>k = 200<br>m/k = 4<br>r/k = 8 | 7.5% ± 0.3%<br>k = 200,<br>$n_s$ = 2000<br>m/k = 4<br>r/k = 8 |

In one embodiment, it should be noted that it is not a goal to show that the k-Space process 1 is the best feature extraction algorithm of the classification algorithms considered (RLSC and SVM), but rather that it can be used to extract features of higher quality than the original one. In fact, in the example embodiments, while for a fixed number of extracted features, k-Space process 1 produces better features than simply using TensorSketch, it is also more expensive in terms of time. If that additional time is used to do learning or prediction with TensorSketch with more features, an overall better generalization error may be obtained. However, feature extraction is widely applicable, and there may be cases where having fewer high quality features is beneficial, e.g., performing multiple learning on the same data, or a very expensive learning tasks.

Figure 4:
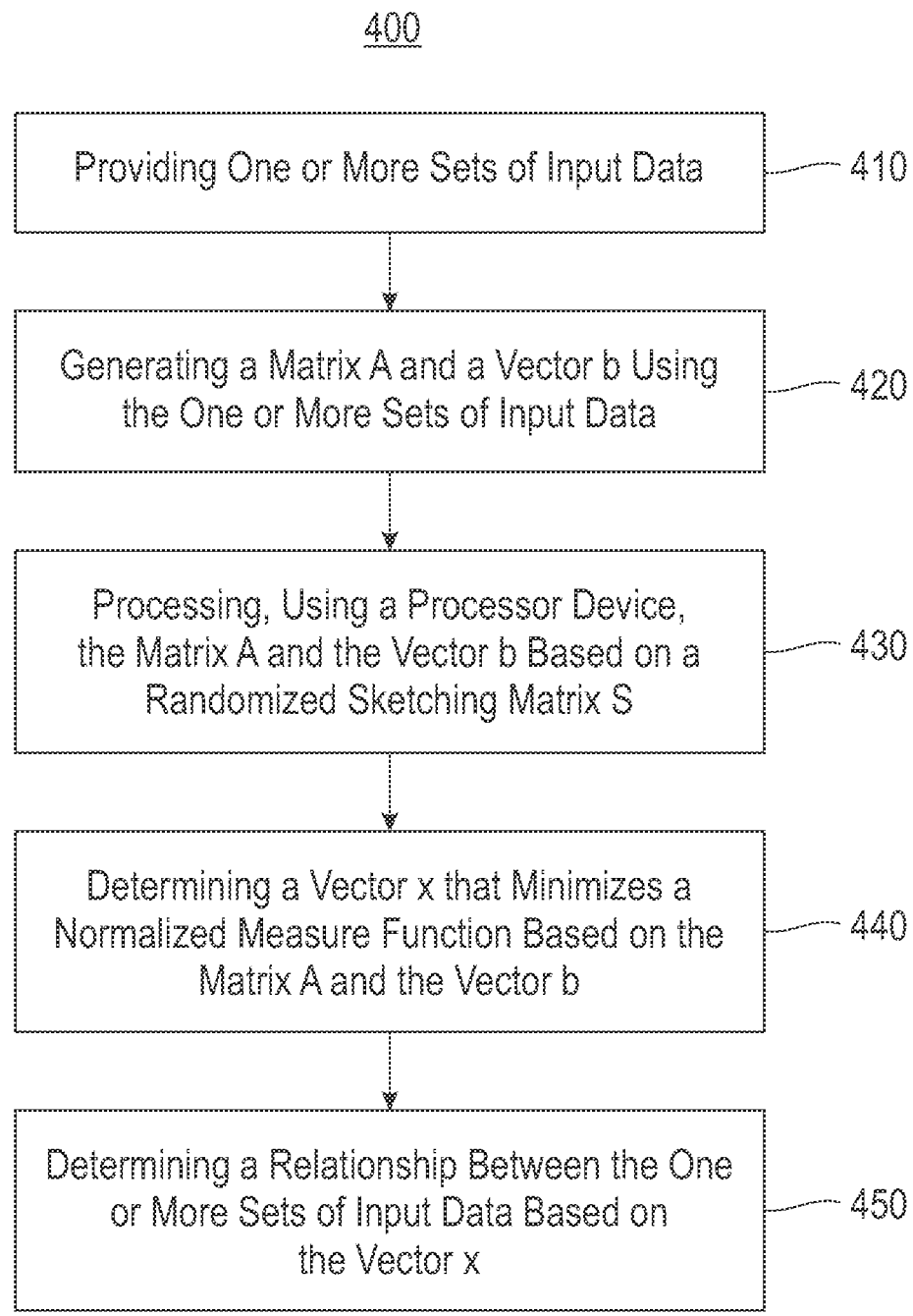
FIG. 4 is a block diagram showing a process for sketching for M-estimators for performing regression, in accordance with an embodiment of the invention.

FIG. 4 is a block diagram showing a process 400 for sketching for M-estimators for performing regression, in accordance with an embodiment of the invention. In one embodiment, in block 410, one or more sets of input data (e.g., samples/sampling, collected data, etc.) is provided. In one embodiment, in block 420 a matrix A and a vector b are generated using the one or more sets of input data (e.g., using the matrix processing module 320 and vector processing module 330, FIG. 3). In one embodiment, in block 430 a processor device is used for processing the matrix A and the vector b based on a randomized sketching matrix S (e.g., as described in relation to FIG. 3). In one embodiment, in block 440 a vector x is provided that minimizes a normalized measure function based on the matrix A and the vector b. In one embodiment, in block 450 a relationship between the one or more sets of input data is determined based on the vector x.

In one embodiment, process 400 may include determining the vector x based on determining the $\min_x \|Ax-b\|_G$, where $A \in \mathbb{R}^{n \times d}$ and $b \in \mathbb{R}^n$, and $\|y\|_G$ for $y \in \mathbb{R}^n$ is specified by the measure function $G: \mathbb{R} \mapsto \mathbb{R}^+$, wherein $\|y\|_G \equiv \Sigma_i G(y_i)$, where i, n and d are positive integers, and the matrix A comprises an n×d matrix. In one embodiment, the sketching matrix S is used to estimate $\|Ax\|_G$, for all $x \in \mathbb{R}^d$. In one embodiment, the sketching matrix S is used for a plurality of M-estimators requiring O(nnz(A)+poly(d log n)) time, wherein the processor device makes one pass over the matrix A for determining a regression solution with a residual error within a constant factor of a specified tolerance and with constant probability, wherein nnz comprises a number of non-zero entries of the matrix A.

Figure 5:
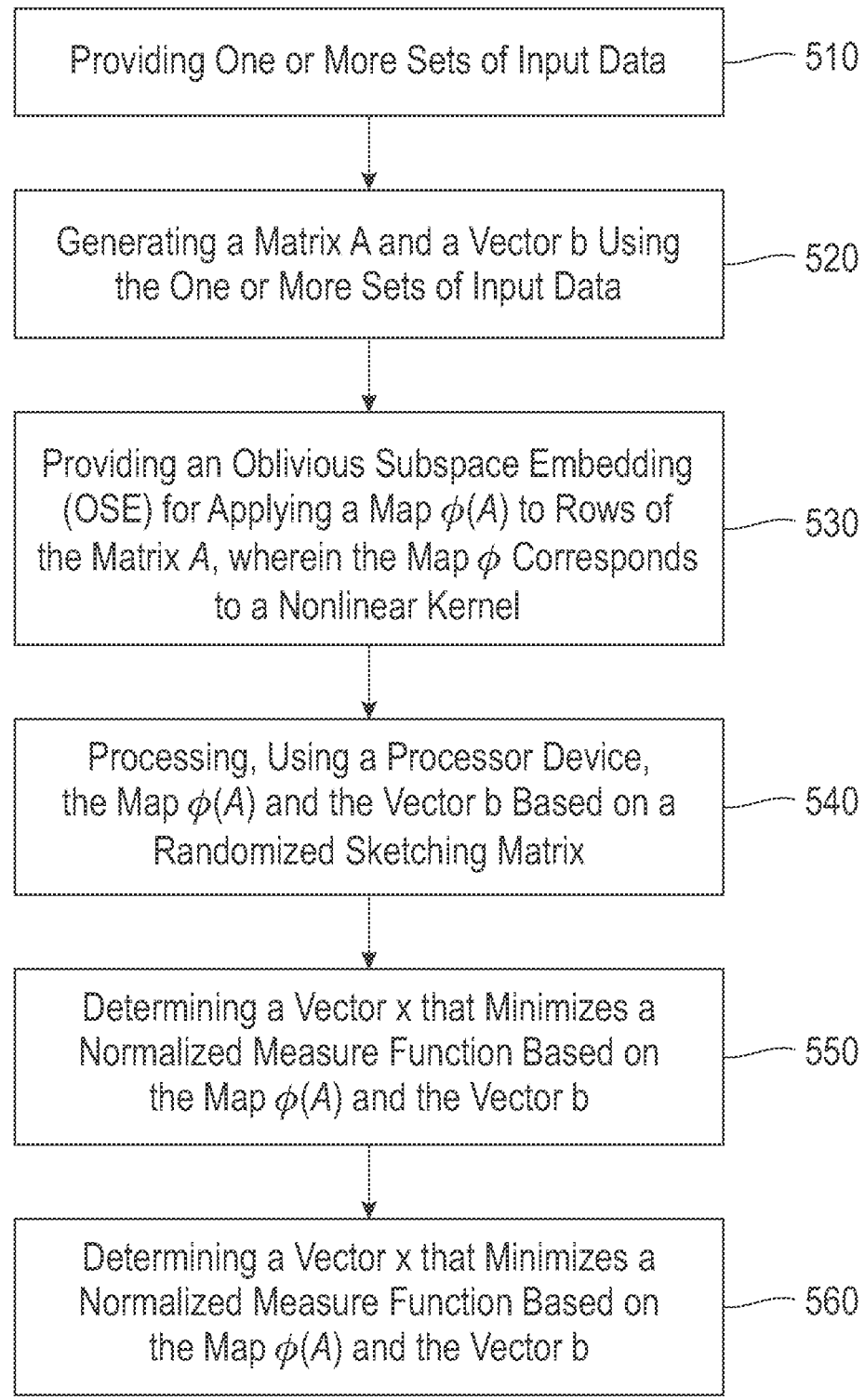
FIG. 5 is a block diagram showing a process for sketching using an OSE for embedding a space induced by a nonlinear kernel, in accordance with an embodiment of the invention.

In one embodiment, the process 400 may include providing an OSE for embedding a space induced by a nonlinear (polynomial) kernel for the matrix A. In one embodiment, embedding the space comprises applying a map $\phi(A)$ to rows of A, wherein the map $\phi(A)$ corresponds to the nonlinear kernel. In one embodiment, the process 400 may include determining the vector x based on determining $\min_x \|\phi(A)x-b\|_G$, where $A \in \mathbb{R}^{n \times d}$ and $b \in \mathbb{R}^n$, and $\|y\|_G$ for $y \in \mathbb{R}^n$ is specified by the measure function $G: \mathbb{R} \mapsto \mathbb{R}^+$, wherein $\|y\|_G \equiv \Sigma_i G(y_i)$, where i, n and d are positive integers, and the matrix A comprises an n×d matrix FIG. 5 is a block diagram showing a process 500 for sketching using an OSE for embedding a space induced by a nonlinear kernel, in accordance with an embodiment of the invention. In one embodiment, in block 510, one or more sets of input data (e.g., samples/sampling, collected data, etc.) is provided. In one embodiment, in block 520 a matrix A and a vector b are generated using the one or more sets of input data (e.g., using the matrix processing module 320 and vector processing module 330, FIG. 3). In one embodiment, in block 530, an OSE is provided for applying a map $\phi(A)$ to rows of the matrix A, where the map $\phi$ corresponds to a nonlinear kernel. In one embodiment, in block 540 a processor device is used for processing map $\phi(A)$ and the vector b based on a randomized sketching matrix S (e.g., as described in relation to FIG. 3). In one embodiment, in block 550 a vector x is provided that minimizes a normalized measure function based on the map $\phi(A)$ and the vector b. In one embodiment, in block 560 a relationship between the one or more sets of input data is determined based on the vector x.

In one embodiment, in process 500 determining the vector x comprises determining the $\min_x \|\phi(A)x-b\|_G$, where $A \in \mathbb{R}^{n \times d}$ and $b \in \mathbb{R}^n$, and $\|y\|_G$ for $y \in \mathbb{R}^n$ is specified by the measure function $G: \mathbb{R} \mapsto \mathbb{R}^+$, wherein $\|y\|_G \equiv \Sigma_i G(y_i)$, where i, n and d are positive integers, and the matrix A comprises an n×d matrix. In one embodiment, in process 500 the sketching matrix S is used to estimate $\|\phi(A)x\|_G$, for all $x \in \mathbb{R}^d$. In one embodiment, in process 500 the map $\phi(A)$ maps each row of A to a higher dimensional space using a polynomial kernel of a given degree.

In one embodiment, process 500 may further include computing an implicit low rank decomposition of $\phi(A)$, and performing PCR with respect to an approximation of top k left singular vectors of $\phi(A)$, where k is a positive integer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining one or more sets of input data;
   performing, by a processor device, a sketching process including:
   generating a matrix A and a vector b using the one or more sets of input data;
   creating, by the processor device, a randomized sketching matrix S based on the matrix A; and
   determining, by the processor device, a vector x that minimizes a normalized measure function based on the matrix A and the vector b; and
   performing, by the processor device, a relationship process using the sketching process for determining a relationship between the one or more sets of input data based on the vector x.

2. The method of claim 1, wherein determining the vector x comprises determining the $\min_x \|Ax-b\|_G$, where $A \in \mathbb{R}^{n \times d}$ and $b \in \mathbb{R}^n$, and $\|y\|_G$ for $y \in \mathbb{R}^n$ is specified by the measure function $G: \mathbb{R} \mapsto \mathbb{R}^+$, and $\|y\|_G = \Sigma_i G(y_i)$, where i, n and d are positive integers, and the matrix A comprises an n×d matrix.

3. The method of claim 2, further comprising:
estimating, by the processor device, $\|Ax\|_G$, for all $x \in \mathbb{R}^d$ based on the sketching matrix S.

4. The method of claim 3, wherein the relationship process further comprises using the sketching matrix S for a plurality of M-estimators requiring $O(nnz(A)+poly(d \log n))$ time, the processor device performs one pass over the matrix A for determining a regression solution with a residual error within a constant factor of a specified tolerance and with constant probability, and nnz comprises a number of non-zero entries of the matrix A.

5. The method of claim 1, further comprising:
embedding, by the processor device, a space induced by a nonlinear polynomial kernel for the matrix A using an oblivious subspace embedding (OSE).

6. The method of claim 5, wherein embedding the space comprises applying, by the processor device, a map $\phi(A)$ to rows of A, and the map $\phi(A)$ corresponds to the nonlinear polynomial kernel.

7. The method of claim 6, wherein determining the vector x comprises determining $\min_x \|\phi(A)x-b\|_G$, where $A \in \mathbb{R}^{n \times d}$ and $b \in \mathbb{R}^n$, and $\|y\|_G$ for $y \in \mathbb{R}^n$ is specified by the measure function $G: \mathbb{R} \mapsto \mathbb{R}^+$, and $\|y\|_G = \Sigma_i G(y_i)$, where i, n and d are positive integers, and the matrix A comprises an n×d matrix.

8. A computer program product for determining relationships between data, the computer program product comprising a computer readable storage medium having program code embodied therewith, the program code executable by a processor to:
receive, by the processor, one or more sets of input data;
perform, by the processor, a sketching process executable by the processor to:
generate a matrix A and a vector b based on the one or more sets of input data;
create, by the processor, a randomized sketching matrix S based on the matrix A; and
determine, by the processor, a vector x that minimizes a normalized measure function based on the matrix A and the vector b; and
perform, by the processor, a relationship process using the sketching process to determine a relationship between the one or more sets of input data based on the vector x.

9. The computer program product of claim 8, wherein determining the vector x comprises further program code executable by the processor to determine the $\min_x \|Ax-b\|_G$, where $A \in \mathbb{R}^{n \times d}$ and $b \in \mathbb{R}^n$, and $\|y\|_G$ for $y \in \mathbb{R}^n$ is specified by the measure function $G: \mathbb{R} \mapsto \mathbb{R}^+$, and $\|y\|_G = \Sigma_i G(y_i)$, where i, n and d are positive integers, and the matrix A comprises an n×d matrix.

10. The computer program product of claim 9, wherein the program code further executable by a processor to estimate $\|Ax\|_G$, for all $x \in \mathbb{R}^d$ based on the sketching matrix S.

11. The computer program product of claim 10, wherein the relationship process further comprises using the sketching matrix S for a plurality of M-estimators requiring $O(nnz(A)+poly(d \log n))$ time, the processor makes one pass over the matrix A for determining a regression solution with a residual error within a constant factor of a specified tolerance and with constant probability, and nnz comprises a number of non-zero entries of the matrix A.

12. The computer program product of claim 8, wherein the program code executable by the processor further to:
embed, by the processor, a space induced by a nonlinear polynomial kernel for the matrix A using an oblivious subspace embedding (OSE).

13. The computer program product of claim 12, wherein the program code executable by the processor further to:
embed the space by applying a map $\phi(A)$ to rows of A, and the map $\phi(A)$ corresponds to the nonlinear polynomial kernel.

14. The computer program product of claim 8, wherein determine the vector x comprises determine $\min_x \|\phi(A)x-b\|_G$, where $A \in \mathbb{R}^{n \times d}$ and $b \in \mathbb{R}^n$, and $\|y\|_G$ for $y \in \mathbb{R}^n$ is specified by the measure function $G: \mathbb{R} \mapsto \mathbb{R}^+$, $\|y\|_G = \Sigma_i G(y_i)$, where i, n and d are positive integers, and the matrix A comprises an n×d matrix.

15. A method comprising:
receiving one or more sets of input data;
performing, by a processor device, a sketching process including:
generating a matrix A and a vector b using the one or more sets of input data;
creating, by the processor device, a randomized sketching matrix S based on the matrix A;
applying, by the processor device, a map $\phi(A)$ to rows of the matrix A using an oblivious subspace embedding (OSE), wherein the map $\phi$ corresponds to a nonlinear kernel;
processing, using the processor device, the map $\phi(A)$ and the vector b based on the randomized sketching matrix S; and
determining a vector x that minimizes a normalized measure function based on the map $\phi(A)$ and the vector b; and
performing, by the processor device, a relationship process using the sketching process for determining a relationship between the one or more sets of input data based on the vector x.

16. The method of claim 15, wherein determining the vector x comprises determining the $\min_x \|\phi(A)x-b\|_G$, where $A \in \mathbb{R}^{n \times d}$ and $b \in \mathbb{R}^n$, and $\|y\|_G$ for $y \in \mathbb{R}^n$ is specified by the measure function $G: \mathbb{R} \mapsto \mathbb{R}^+$, and $\|y\|_G = \Sigma_i G(y_i)$, where i, n and d are positive integers, and the matrix A comprises an n×d matrix.

17. The method of claim 16, further comprising estimating, by the processor device, $\|\phi(A)x\|_G$, for all $x \in \mathbb{R}^d$ based on the sketching matrix S.

18. The method of claim 17, wherein the map $\phi(A)$ maps each row of A to a higher dimensional space using a polynomial kernel of a given degree.

19. The method of claim 18, further comprising:
computing, by the processor device, an implicit low rank decomposition of $\phi(A)$.

20. The method of claim 19, further comprising:
performing, by the processor device, a principal component regression (PCR) process with respect to an approximation of top k left singular vectors of $\phi(A)$, wherein k is a positive integer.

* * * * *